(12) United States Patent
Raets

(10) Patent No.: US 6,201,359 B1
(45) Date of Patent: Mar. 13, 2001

(54) HIGH-VOLTAGE GENERATOR INCLUDING A HIGH-VOLTAGE UNIT

(75) Inventor: Hubert Raets, Landgraaf (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/062,776

(22) Filed: Apr. 16, 1998

(30) Foreign Application Priority Data

May 2, 1997 (DE) .............................. 197 18 656

(51) Int. Cl.[7] ....................................... G09G 1/04
(52) U.S. Cl. ........................ 315/382.1; 315/411
(58) Field of Search ................ 315/411, 382.1, 315/382, 345, 326

(56) References Cited

U.S. PATENT DOCUMENTS

| | | | |
|---|---|---|---|
| 3,940,789 | * 2/1976 | Kratz et al. | 358/82 |
| 4,788,591 | 11/1988 | Decraemer | 358/190 |
| 4,835,668 | * 5/1989 | Palm et al. | 363/21 |
| 5,459,378 | * 10/1995 | Kato et al. | 315/382.1 |
| 5,576,681 | * 11/1996 | Sander et al. | 336/208 |

* cited by examiner

*Primary Examiner*—Seungsook Ham
*Assistant Examiner*—Shun Lee
(74) *Attorney, Agent, or Firm*—Edward W. Goodman

(57) ABSTRACT

A high-voltage generator includes a high-voltage unit (1) and a further voltage generating unit (2) for generating DC high voltages ($U_{F1}$, $U_{F2}$), the voltage generating unit (2) including an adjustment unit (3) for adjusting a DC high-voltage ($U_{F1}$, $U_{F2}$) in an adjusting range between a lower and an upper limit voltage. In order to enable an as low as possible electric strength of the adjustment unit (3) and to reduce the impedance of the voltage generating unit (2), a DC voltage of between 100% and 200% of the upper limit voltage is applied to one connection point of the adjustment unit (3) whereas a DC voltage of between 50% and 100% of the lower limit voltage is applied to the other connection point of the adjustment unit (3).

11 Claims, 5 Drawing Sheets

HIGH-VOLTAGE GENERATOR INCLUDING A HIGH-VOLTAGE UNIT

BACKGROUND OF THE INVENTION

1. Field of the Invention

The invention relates to a high-voltage generator which includes a high-voltage unit for generating an output DC high voltage, and a voltage generating unit for generating at least one further, lower DC high voltage, the voltage generating unit receiving a DC voltage from the high-voltage unit, and including an adjustment unit for adjusting the further DC high voltage in a voltage range between a lower and an upper limit voltage.

2. Description of the Related Art

A high-voltage generator of this kind is known from U.S. Pat. No. 4,788,591. Therein, an output DC high voltage for feeding the anode of a picture tube is generated by means of a diode split transformer. Via an adjustment unit with two potentiometers, two voltages are generated so as to focus the electrons in the picture tube. The potentiometers are used to adjust these voltages in a range between a lower and an upper limit voltage which generally amount to 20% and 29%, respectively, of the output DC voltage in the case of a picture tube. One of the series-connected potentiometers is connected to a connection point of the high-voltage unit which carries a DC voltage. The base of the second potentiometer is connected to a DC voltage potential of 210 V which generally serves as a reference potential in a picture tube.

The dimensions and cost of a voltage generating unit in which adjustable DC high voltages are generated, for example, for the focusing of electrons in a tube, notably a picture tube, are determined essentially by the required electric strength and by the power loss of the adjustment unit which includes two potentiometers in the known device. In the case of a picture tube in which the output DC high voltage amounts to, for example, 25 kV so that the lower and the upper limit voltage amount to approximately 5 kV and 7.25 kV, respectively, the adjustment unit must have a high electric strength. In the known device, in which two series-connected potentiometers are arranged between a high-voltage potential of the high-voltage unit and a low-voltage potential which acts as a reference potential, the potentiometers must have a high electric strength, leading to high power losses, high costs and large dimensions of the potentiometers.

SUMMARY OF THE INVENTION

Therefore, it is an object of the invention to improve a high-voltage generator of the kind set forth, notably to provide a high-voltage generator which is inexpensive, has small dimensions and a high efficiency.

On the basis of a high-voltage generator of the kind set forth, this object is achieved in that there are provided means for supplying the adjustment unit with a DC voltage of between 100% and 200% of the upper limit voltage at one connection point, and with a DC voltage of between 50% and 100% of the lower limit voltage at a further connection point, said supplying means including at least one connection to a DC voltage point of the high-voltage unit which carries a DC voltage of between 50% of the lower limit voltage and 200% of the upper limit voltage.

The invention is based on the recognition of the fact that the adjustment unit need not necessarily be connected to a connection point carrying a low-voltage potential (for example, ground) which serves as a reference potential. In comparison with the known device, the adjustment unit in the device according to the invention may have a significantly lower electric strength since a significantly smaller voltage difference exists across the adjustment unit. The high-voltage generating unit also has a low impedance, so that variations of the DC high voltages, caused by variations of current values, are as small as possible. When the DC high voltages are used to focus the electrons in a picture tube, extremely stable focusing will thus be achieved. The closer the DC voltage at one connection point is to 100% of the upper limit voltage and the closer the DC voltage at the other connection point is to 100% of the lower limit voltage, the lower the electric strength of the adjustment unit may be, and the more advantageous the invention will be.

In a further embodiment of the high-voltage generator according to the invention, the connection point is connected to a DC voltage point of the high-voltage unit which carries a DC voltage of between 100% and 200% of the upper limit voltage, the further connection point being connected to a further DC voltage point of the high-voltage unit which carries a DC voltage of between 50% and 100% of the lower limit voltage. Using simple means, it is thus achieved that a small voltage difference occurs across the adjustment unit. In conformity with the number of amplifier stages of the high-voltage unit, suitable DC voltage points of the high-voltage unit can be selected for connection of the adjustment unit.

The high-voltage generator, in an embodiment, includes a transformer with a first secondary winding for generating the input voltage of the high-voltage unit, the transformer having a second secondary winding with a downstream rectifier circuit, the output connections of the rectifier circuit being connected to a respective one of the connection points of the adjustment unit, one of the connection points of the adjustment unit being connected to a DC voltage point of the high-voltage unit which carries a DC voltage of between 50% and 100% of the lower limit voltage, or between 100% and 200% of the upper limit voltage. This embodiment is particularly attractive for use when the high-voltage unit is suitable for supplying a DC voltage which corresponds as accurately as possible to the upper or the lower limit voltage, but not a further DC voltage which corresponds to the other limit voltage. The latter is then generated by way of the secondary winding of the transformer, so that only the maximum required voltage difference exists across the adjustment unit.

An alternative embodiment is characterized in that the high-voltage generator includes a transformer having a first secondary winding for generating the input voltage of the high-voltage unit, that the transformer includes a second secondary winding, that downstream from a first connection point and a central connection point of the secondary winding, there is connected a first rectifier circuit having a first output connection connected to a first connection point of the adjustment unit, and a second output connection connected to a DC voltage point of the high-voltage unit which carries a DC voltage which lies within the adjusting range, and that downstream from a second connection point and the central connection point of the secondary winding, there is connected a second rectifier circuit having a first output connection connected to the second connection point of the adjustment unit, and a second output connection connected to the same DC voltage point of the high-voltage unit. This embodiment is particularly advantageous when the high-voltage unit is suitable to derive a DC voltage which lies within the adjusting range, but not suitable to derive DC voltages which are exactly equal to the lower or the upper limit voltage. In this embodiment, two voltage potentials are derived from the DC voltage which lies within the adjusting range and is derived from the high-voltage unit, said voltage potentials corresponding to the upper and the lower limit voltage, so that once more, only the maximum required voltage difference is present across the adjustment unit.

A further embodiment of the invention is characterized in that one of the connection points of the adjustment unit is connected to a DC voltage point of the high-voltage unit which carries a DC voltage of between 50% and 100% of the lower limit voltage, or between 100% and 200% of the upper limit voltage, and that the supplying means includes a voltage multiplier circuit, notably a high-voltage cascade multiplier circuit, for generating a DC voltage from the input voltage of the high-voltage unit in order to feed the adjustment unit at the other connection point. This solution is particularly appropriate in cases where the high-voltage unit is suitable to derive a DC voltage which corresponds exactly to the upper or the lower limit voltage. Selection of the amplification factor of the voltage multiplier circuit then enables a DC voltage to be generated for the adjustment unit which corresponds exactly to the other limit voltage which cannot be derived from the high-voltage unit. Once more only the maximum required voltage difference will be present across the adjustment unit in this embodiment. As a result, the construction of the transformer with a second secondary winding as described above can be avoided.

A preferred embodiment is characterized in that the adjustment unit includes two potentiometers for adjusting a respective DC high voltage each. This is the simplest and least expensive implementation of the adjustment unit. However, it is also possible to implement the adjustment unit or the functions of potentiometers by means of other circuit means.

A preferred embodiment is characterized in that the high-voltage unit includes a cascade high-voltage multiplier circuit, or a diode split transformer circuit. The high-voltage unit of a high-voltage generator is realized in this way particularly in the case of picture tubes. The number of amplifier stages of such a high-voltage unit is irrelevant in the context of the idea of the invention.

An embodiment is characterized in that there are provided means for deriving a further DC voltage from a low AC voltage used for generating the input voltage of the high-voltage unit. The deriving means may be, for example, a potentiometer and an additional connection to the secondary winding of the transformer which steps up an AC voltage to the input voltage of the high-voltage unit. The potentiometer may also be connected to an amplifier stage of an additional high-voltage cascade multiplier circuit for generating a DC voltage for the adjustment unit.

The invention also relates to a display apparatus which includes a picture tube, having at least one focusing electrode, and a high-voltage generator with a high-voltage unit for generating an output DC high voltage, and a focus unit for generating at least one focus voltage, the focus unit receiving a DC voltage from the high-voltage unit and including an adjustment unit for adjusting the focus voltage in an adjusting range between a lower and an upper limit voltage, characterized in that there are provided means for supplying the adjustment unit with a DC voltage of between 100% and 200% of the upper limit voltage at one connection point, and with a DC voltage of between 50% and 100% of the lower limit voltage at a further connection point, and that the supplying means includes at least one connection to a DC voltage point of the high-voltage unit which carries a DC voltage of between 50% of the lower limit voltage and 200% of the upper limit voltage. The invention enables simple and inexpensive implementation of the focus unit. The low impedance of the focus unit, moreover, results in small dimensions, a high efficiency and ultimately very stable focusing.

BRIEF DESCRIPTION OF THE DRAWINGS

The invention will be described in detail hereinafter with reference to the drawing. Therein.

DESCRIPTION OF THE PREFERRED EMBODIMENTS

Figure 1:
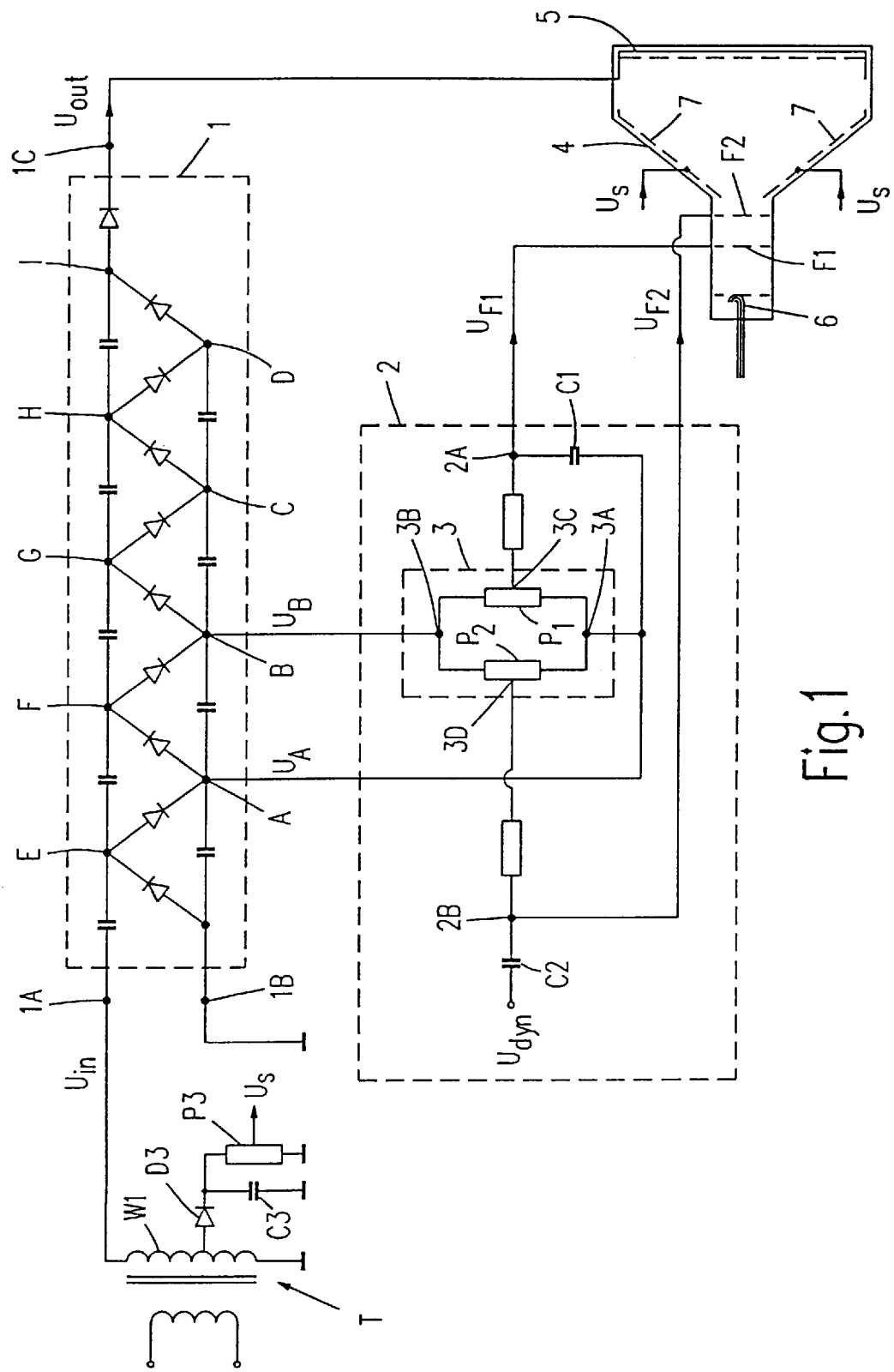
FIG. 1 shows a circuit diagram of a first embodiment of a high-voltage generator according to the invention with a picture tube.

FIG. 1 shows a circuit diagram of a first embodiment of a high-voltage generator according to the invention. The high-voltage unit 1 includes a cascade high-voltage multiplier circuit which comprises ten multiplier stages and generates, from a symmetrical AC voltage $U_{in}$ present at the inputs 1A, 1B at its input side, a DC high-voltage $U_{out}$ which is present at the output 1C and is a factor of ten larger than the amplitude of the input voltage $U_{in}$. As is shown, the symmetrical input AC voltage $U_{in}$ may be the voltage across the secondary winding W1 of the transformer T of a series-parallel-resonant, frequency variable converter (not shown). The output DC voltage $U_{out}$ of the high-voltage unit 1, for example, amounting to 25 kV (with respect to ground), serves to feed the anode 5 of a picture tube 4 so as to accelerate the electrons emitted by the cathode 6.

The DC voltage points A, B, C, D of the high-voltage unit 1 carry respective DC high voltages which amount to 20% (point A), 40% (B), 60% (C) and 80% (D), respectively, of the output voltage $U_{out}$ (with respect to ground). The oppositely situated AC voltage points E, F, G, H, I of the high-voltage unit 1, however, carry respective AC voltages having amplitudes which are exactly equal to the amplitude of the input voltage $U_{in}$; however, a different DC offset of, for example, 10% (at point E) of the output voltage $U_{out}$ is superposed thereon.

A focus unit 2 is provided so as to generate two focus voltages $U_{F1}$, $U_{F2}$ for feeding the two focus electrodes F1, F2 of the picture tube 4. The focus unit includes an adjustment unit 3 which enables adjustment of the focus voltages $U_{F1}$, $U_{F2}$ in the adjusting range by means of two potentiometers P1, P2. In a picture tube, the DC voltages $U_{F1}$ and $U_{F2}$ must be adjustable between approximately 20% (=lower limit voltage) and 29% (=upper limit voltage) of the anode voltage $U_{out}$ of the picture tube 4. A first connection point 3A of the adjustment unit 3 is connected to the DC voltage point A of the high-voltage unit 1 (i.e., between the second and the fourth amplifier stage) which carries the DC voltage $U_A=0.2*U_{out}$ (=100% of the lower limit voltage). The second connection point 3B of the adjustment unit 3 is connected to the DC voltage point B of the high-voltage unit 1 (between the fourth and the sixth amplifier stage) which carries the DC voltage $U_B=0.4*U_{out}$ (=138% of the upper limit voltage). From the adjustable output connection 3C of the potentiometer P1, there is derived, via a resistor, the DC focus voltage $U_{F1}$ for adjusting the horizontal focus correction of the picture tube 4; between the connections 2A and 3A there is connected a smoothing capacitor for reducing the ripple of the focus voltage $U_{F1}$. Via a resistor, the DC voltage component for the focus voltage $U_{F2}$ is derived from the adjustable output connection 3D of the potentiometer P2; on this DC voltage component there is superposed an AC voltage component $U_{dyn}$, via a capacitor C2 at the connection 2B, in order to optimize the vertical focusing in the picture tube 4.

From the secondary winding W1 of the transformer T, there is derived, via a half-wave rectifier circuit which consists of a diode D3 and a capacitor C3 and is connected to a potentiometer P3, an adjustable screen voltage $U_s$ which is applied to further electron focusing means, for example, deflection plates 7 of the picture tube 4.

In the high-voltage generator according to the invention, only a voltage difference of $0.2*U_{out}$ (so, for example, 5 kV for $U_{out}=25$ kV) is present across the potentiometers P1 and P2. As a result, the necessary electric strength of the potentiometers P1, P2 and their dimensions can be substantially reduced in comparison with known potentiometers. At the same time, the losses in the potentiometers P1, P2 are significantly lower since these losses are approximately proportional to the square of the voltage across the potentiometers P1, P2. The impedance of the focus unit 2 is also substantially lower than in known devices. It is thus achieved that variations of the focus voltages $U_{F1}$, $U_{F2}$, as may be caused by variations of the focus current, are very small so that the focusing remains very stable. Overall, the complete focus unit 2 is smaller and less expensive than known units.

Figure 2:
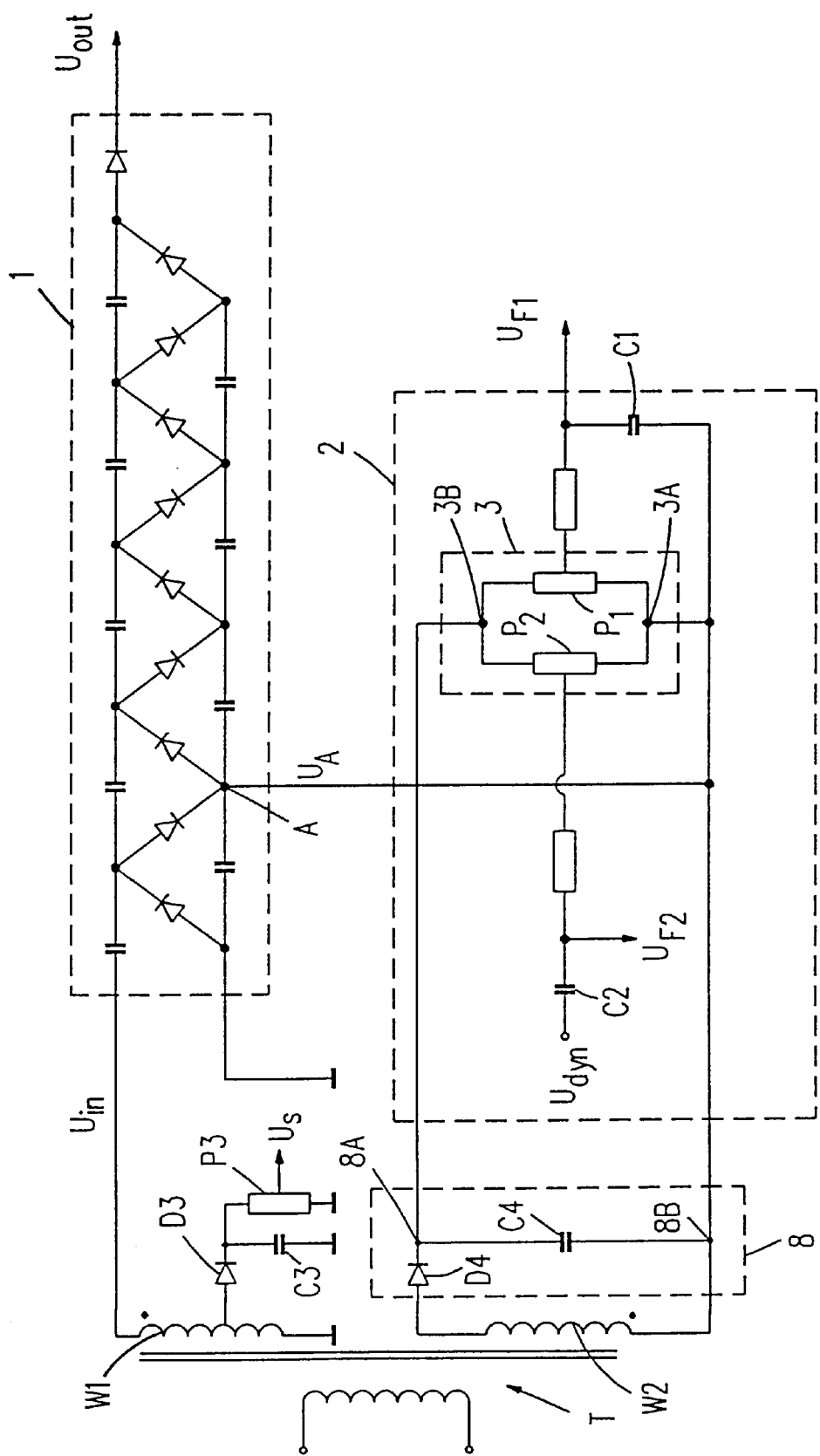
FIG. 2 shows a circuit diagram of a second embodiment of a high-voltage generator according to the invention.

FIG. 2 shows a further embodiment of a high-voltage generator according to the invention. Unlike the embodiment shown in FIG. 1, the DC voltage present at the second connection point 3B of the adjusting unit 3 is not derived from the high-voltage unit 1, but is generated separately. To this end, the transformer T includes a second secondary winding W2 which transforms a voltage present across the primary winding of the transformer T into a high voltage. This high voltage is rectified by a rectifier circuit 8, consisting of a diode D4 and a capacitor C4, so that the connection point 8A carries a DC high-voltage for feeding the connection point 3B of the adjustment unit 3. The connection point 8B is advantageously connected to the DC voltage point A (and hence also to the connection point 3A).

Via selection of the transformation ratio of the transformer T (by choosing the number of turns of the secondary winding W2), the voltage present between the connection points 8A and 8B can be adjusted in such a manner that only the maximum required voltage difference occurs across the potentiometers P1, P2. For example, the transformation ratio can be chosen so that a voltage of $0.29*U_{out}$ (with respect to ground) is present at the connection point 8A. A voltage of $0.2*U_{out}$ (with respect to ground) is present at the connection point 8B. The smallest possible voltage difference of $0.09*U_{out}$ then exists across the potentiometers P1 and P2.

Preferably, the connections to the secondary winding 2 are configured in such a manner that the voltage derived therefrom is phase shifted 180° relative to the voltage derived from the secondary winding W1; this is denoted by the dot at the upper end adjacent W1 and at the lower end adjacent W2. It is thus achieved that the ripple of the voltage $U_A$ present at the DC voltage point A is compensated by the ripple of opposite phase at the connection point 8A. By suitable selection of the value of the capacitance C4, the ripple at the connection point 8A can be adjusted so as to be equal to the ripple at the DC voltage point A, so that the ripple of the focus voltages $U_{F1}$, $U_{F2}$ is minimized. The capacitance of the capacitor C1, also providing a low-ripple focus voltage $U_{F1}$ due to filtering, can then also be reduced.

Figure 3:
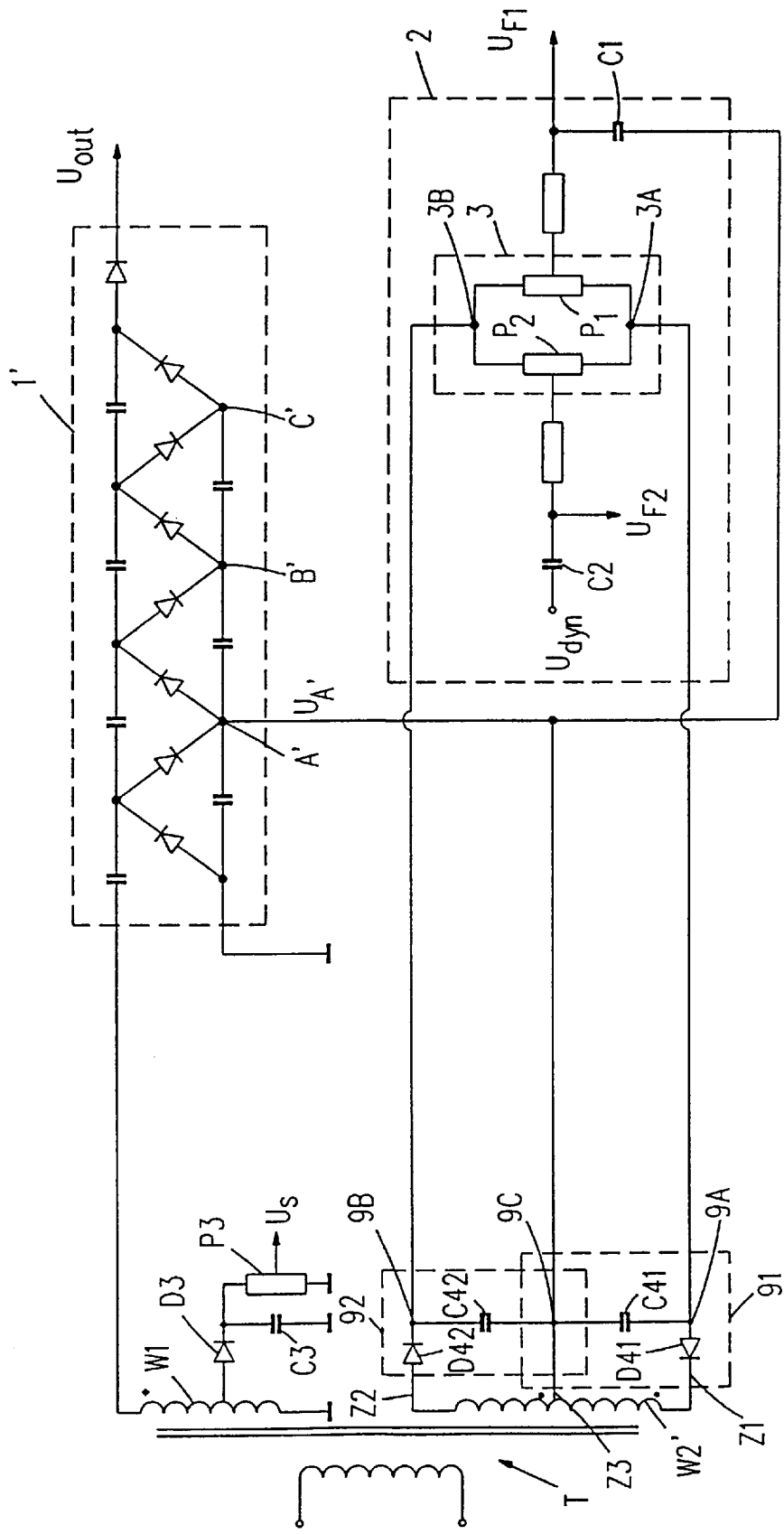
FIG. 3 shows a circuit diagram of a third embodiment of a high-voltage generator according to the invention.

FIG. 3 shows a third embodiment of a high-voltage generator according to the invention. The high-voltage unit 1' is now an octupler cascade. The voltage $U_A$, at the DC voltage point A' amounts to $0.25*U_{out}$ and hence lies almost at the center of the adjusting range. In order to generate the voltage required for the adjustment unit 3, the transformer T includes a secondary winding W2' with three connection points Z1, Z2, Z3 which are succeeded by two half-wave rectifier circuits 91, 92. Between the connection points 9A and 9C, carrying the DC voltage $U_A$, a DC voltage is derived from the voltage derived from the tappings Z1 and Z3, said DC voltage being obtained by rectification by means of a diode D41 and a capacitor C41 and being equal to the voltage difference between the lowest focus voltage to be adjusted and the voltage $U_A$. The voltage potential at the connection point 9A, connected to the connection point 3A of the adjustment unit 3, is then negative with respect to the voltage potential at the connection point 9C. Analogously, between the connection points 9B and 9C there is generated a voltage which is equal to the voltage difference between the highest fucus voltage to be adjusted and the DC voltage $U_A$. The voltage potential at the connection point 9B, connected to the connection point 3B of the adjustment unit 3, is then positive with respect to the voltage potential at the connection point 9C. Only the voltage generated between the connection points 9A and 9B, and corresponding to the difference between the minimum and the maximum focus voltage to be adjusted, is again present across the potentiometers P1, P2. The voltage across the capacitor C1 then amounts to no more than the focus voltage range to be adjusted; usually a lower voltage is present.

By suitably choosing the connections to the secondary windings W1 and W2' (denoted by the dots adjacent the secondary windings W1, W2'), ripple compensation can again be achieved by phase shifting as in the embodiment shown in FIG. 2. The capacitance of the capacitor C1 can thus be reduced.

Figure 4:
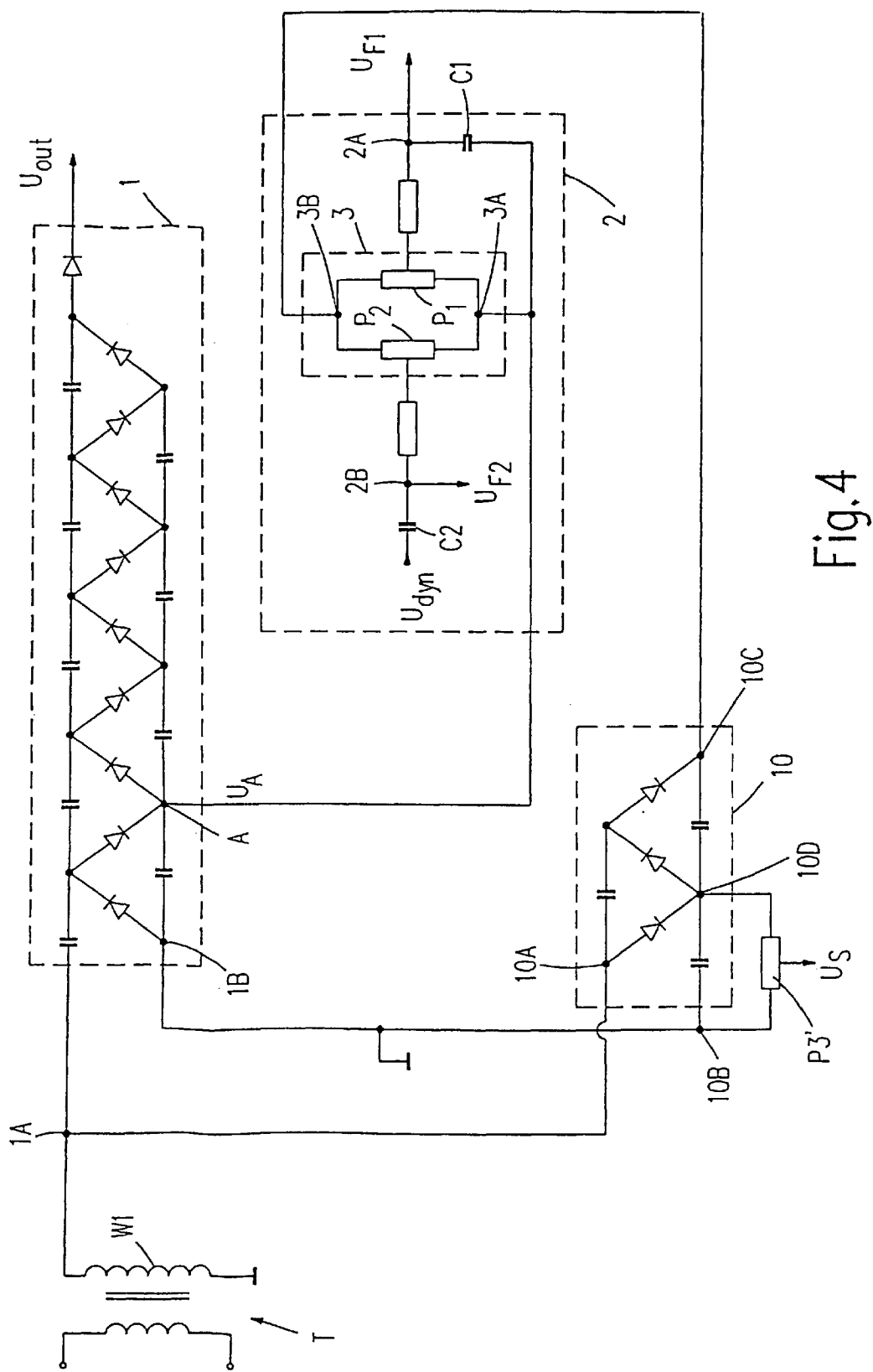
FIG. 4 shows a circuit diagram of a fourth embodiment of a high-voltage generator according to the invention.

FIG. 4 shows an alternative for generating a suitable voltage for the connection point 3B of the adjustment unit 3. The input connection 3A is again connected to the DC voltage connection A of a times-ten cascade 1. In order to generate the voltage at the connection point 3B, there is provided a separate tripler cascade 10 which generates, from the AC voltage present at the input connections 1A, 1B of the times-ten cascade 1, a DC voltage which is a factor three higher at the output 10C. Consequently, a voltage amounting to only 10% of the output voltage $U_{out}$ of the times-ten cascade 1 is then present across the potentiometers P1, P2. By suitably proportioning the tripler cascade 10, the internal resistance thereof can be chosen to be such that a voltage drop of $0.01*U_{out}$ occurs across it, so that only the maximum required voltage of $0.09*U_{out}$ exists across the potentiometers P1, P2.

Unlike in the embodiments shown in the FIGS. 2 and 3, the transformer T in this embodiment does not require an additional secondary winding. As a result, the construction of the transformer T may be substantially simpler and hence less expensive, and it can also be optimized better. The screen voltage $U_s$ can now be derived between the connection points 10B and 10D of the tripler cascade 10 by means of a potentiometer P3', so that complex tapping of the secondary winding W1 of the transformer T can be avoided.

Figure 5:
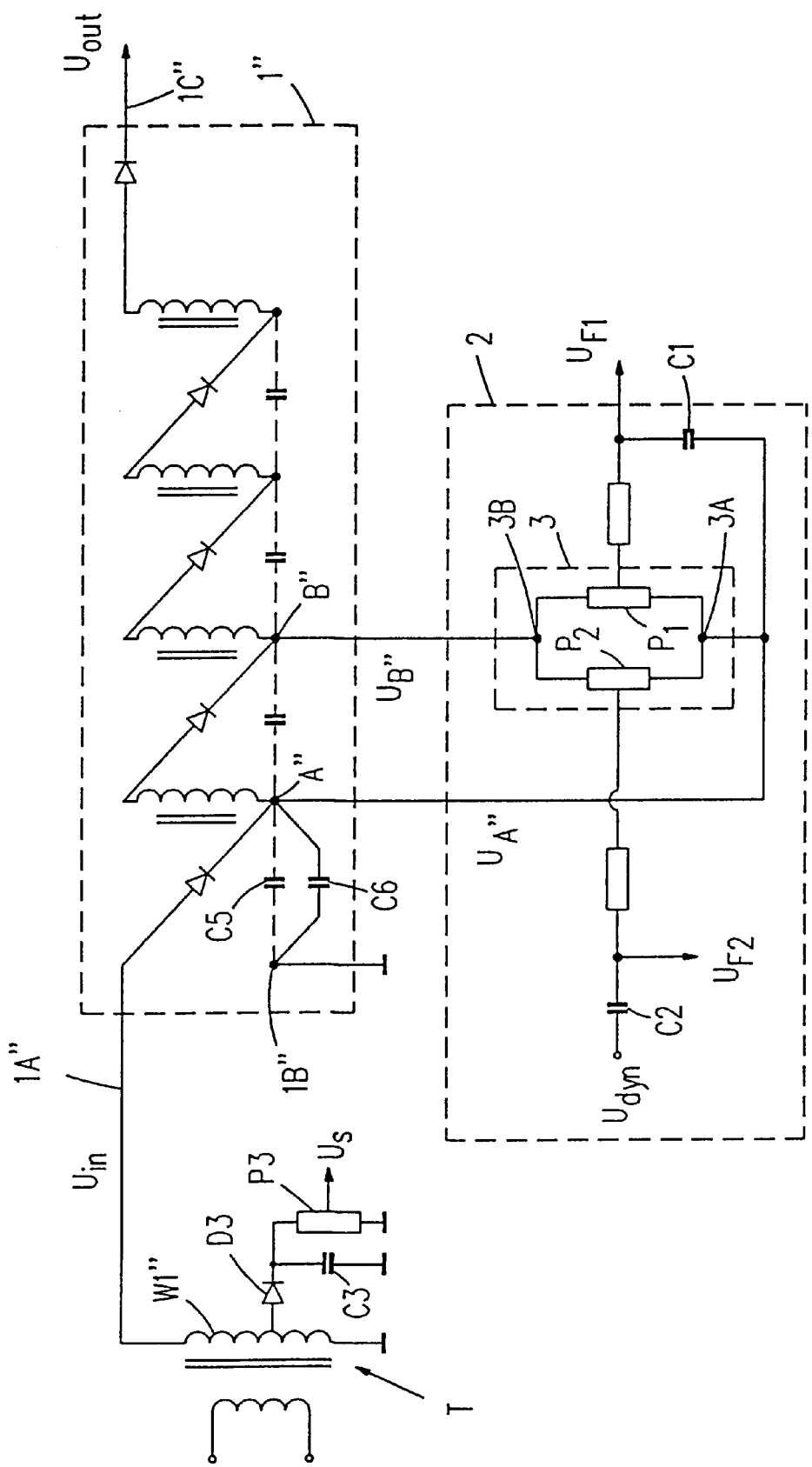
FIG. 5 shows a circuit diagram of a high-voltage generator according to the invention with a diode split transformer.

FIG. 5 shows a high-voltage generator according to the invention in which the high-voltage unit 1" includes a five-stage diode split transformer for generating the DC high-voltage $U_{out}$. This transformer derives a DC voltage $U_{out}$ which is a factor of 10 higher from the AC voltage $U_{in}$ present at the input. The DC voltage points A", connected to the connection point 3A (i.e., between the first and the second amplifier stage) and B", connected to the connection point 3B (between the second and the third amplifier stage) also carry a DC voltage $U_{A"}=0.2*U_{out}$ and $U_{B"}=0.4*U_{out}$, respectively. Smoothing of the focus voltage $U_{F1}$ is again achieved by means of the series connection of the capacitances C1 and C5. The capacitance C5 corresponds to the layer capacitance across the secondary winding W1" of the transformer T. Because the layer capacitance C5 in a diode split transformer is often less than or approximately equal to the capacitance C1, additionally, a capacitor C6 may be connected parallel to C5. Moreover, a resistor for current limitation may be connected in series with the capacitance C6.

The possibilities for generating the voltage for the connection points 3A, 3B of the adjustment unit 3 as shown in the FIGS. 2 to 4 can also be realized in a diode split transformer 1" of the kind shown in FIG. 5. When a second secondary winding (W2, W2" in the FIGS. 2, 3) is used, however, the connections thereof should be in phase with the connections of the first secondary winding W1. Ripple compensation is not possible. Moreover, because of the low capacitance of the layer capacitance C5, additionally a low-pass circuit may be provided (for example, a resistor between A" and 3A and a capacitor between 3A and ground) in order to suppress the ripple at the DC voltage point A".

The potentiometers P1, P2 of the adjusting unit 3 can also be implemented by means of suitable circuit means, for example, a current mirror circuit, an RC low-pass circuit, a flyback transformer circuit or an adjustable zener diode circuit.

The invention can, in principle, also be used for high-voltage generators whose high-voltage unit includes more or less amplifier stages than the embodiments shown or in which the DC high voltage $U_{out}$ is generated by utilizing other means.

What is claimed is:

1. A high-voltage generator comprising:
   a high-voltage unit for generating an output DC high voltage from an input AC voltage; and
   a voltage generating unit for generating at least one further, lower DC high voltage, said voltage generating unit receiving a DC voltage from the high-voltage unit and including an adjustment unit for adjusting the at least one further, lower DC high voltage in a voltage range between a lower and an upper limit voltage,
   characterized in that the adjustment unit comprises a first connection point for receiving a first DC voltage equal to or greater than said upper limit voltage, and a second connection point for receiving a second DC voltage less than or equal to said lower limit voltage, that said high-voltage unit comprises a DC voltage point coupled to one of said first and second connection points of the adjustment unit for supplying one of said first and second DC voltages, respectively, and that said high-voltage generator further comprises a voltage multiplier circuit having an input coupled to receive the input AC voltage of the high-voltage unit, and an output coupled to the other of said first and second connection points of the adjustment unit for supplying the other of said first and second DC voltages.

2. The high-voltage generator as claimed in claim 1, characterized in that said at least one further, lower DC high voltage comprises two lower DC high voltages, and the adjustment unit comprises two potentiometers for adjusting the two lower DC high voltages, respectively.

3. The high-voltage generator as claimed in claim 1, characterized in that the high-voltage unit comprises a cascade high-voltage multiplier circuit.

4. The high-voltage generator as claimed in claim 1, characterized in that said high-voltage generator further comprises means for generating a low AC voltage, and means for deriving a further DC voltage from the low AC voltage, said low AC voltage also providing the input AC voltage for the high-voltage unit.

5. The high-voltage generator as claimed in claim 1, characterized in that the high-voltage unit comprises a diode split transformer circuit.

6. A display apparatus comprising a picture tube having at least one focusing electrode, and a high-voltage generator, said high-voltage generator comprising:

a high-voltage unit for generating an output DC high voltage from an input AC voltage; and a focus unit for generating at least one focus voltage, said focus unit receiving a DC voltage from the high-voltage unit and including an adjustment unit for adjusting the at least one focus voltage in an adjusting range between a lower and an upper limit voltage, characterized in that the adjustment unit comprises a first connection point for receiving a first DC voltage equal to or greater than said upper limit voltage, and a second connection point for receiving a second DC voltage less than or equal to said lower limit voltage, that said high-voltage unit comprises a DC voltage point coupled to one of said first and second connection points of the adjustment unit for supplying one of said first and second DC voltages, respectively, and that said high-voltage generator further comprises a voltage multiplier circuit having an input coupled to receive the input AC voltage of the high-voltage unit, and an output coupled to the other of said first and second connection points of the adjustment unit for supplying the other of said first and second DC voltages.

7. The display apparatus as claimed in claim 6, characterized in that the high-voltage unit comprises a ten-stage cascade multiplier circuit, and that the second connection point of the adjustment unit is connected to the DC voltage point of the high-voltage unit, said DC voltage point being arranged between a second and a fourth amplifier stage of the ten-stage cascade multiplier circuit.

8. The display apparatus as claimed in claim 6, characterized in that the high-voltage unit comprises a ten-stage cascade multiplier circuit, and that the first connection point of the adjustment unit is connected to the DC voltage point of the high-voltage unit, the DC voltage point being arranged between a fourth and a sixth amplifier stage of the ten-stage cascade multiplier circuit.

9. The display apparatus as claimed in claim 6, characterized in that the lower limit voltage is approximately 20% of the output DC high voltage, and the upper limit voltage is approximately 29% of the output DC high voltage.

10. The display apparatus as claimed in claim 6, characterized in that the high-voltage unit comprises a five-stage diode split transformer circuit, and that the second connection point of the adjustment unit is connected to the DC voltage point of the high-voltage unit, the DC voltage point being arranged between a first and a second amplifier stage of the five-stage diode split transformer circuit.

11. The display apparatus as claimed in claim 6, characterized in that the high-voltage unit comprises a five-stage diode split transformer circuit, and that the first connection point of the adjustment unit is connected to the DC voltage point of the high-voltage unit, the DC voltage point being arranged between a second and a third amplifier stage of the five-stage diode split transformer circuit.

* * * * *